US012792659B2

(12) United States Patent
Sinha

(10) Patent No.: US 12,792,659 B2
(45) Date of Patent: Nov. 10, 2026

(54) INFORMATION PROCESSING METHOD, APPARATUS AND ELECTRONIC DEVICE

(71) Applicant: Lemon Inc., Grand Cayman (KY)

(72) Inventor: Parth Vijay Sinha, New Delhi (IN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/811,036

(22) Filed: Aug. 21, 2024

(65) Prior Publication Data

US 2024/0414390 A1 Dec. 12, 2024

Related U.S. Application Data

(63) Continuation of application No. PCT/SG2023/050325, filed on May 11, 2023.

(30) Foreign Application Priority Data

May 30, 2022 (IN) ............................ 202221030941

(51) Int. Cl.
*H04N 21/2743* (2011.01)
*G06F 16/48* (2019.01)
(Continued)

(52) U.S. Cl.
CPC ............. *G06F 16/48* (2019.01); *G06Q 10/40* (2026.01); *G06Q 10/46* (2026.01); *H04N 21/2743* (2013.01); *H04N 21/44204* (2013.01)

(58) Field of Classification Search
CPC ......... H04N 21/2743; H04N 21/44204; H04N 21/4788; G06F 16/743; G06F 16/78;
(Continued)

(56) References Cited

U.S. PATENT DOCUMENTS

| | | | | |
|---|---|---|---|---|
| 9,143,542 B1 * | 9/2015 | Tseytlin | ................... | A61B 6/00 |
| 2013/0073568 A1 * | 3/2013 | Federov | ............ | G06Q 30/0269 707/E17.069 |

(Continued)

FOREIGN PATENT DOCUMENTS

| | | |
|---|---|---|
| CN | 102880712 A | 1/2013 |
| CN | 103345399 A | 10/2013 |
| CN | 113365133 A | 9/2021 |

OTHER PUBLICATIONS

Hamasaki M. et al., Songrium: A Music Browsing Assistance Service based on Visualization of Massive Open Collaboration within Music Content Creation Community. Proceedings of the 9th International Symposium on Open Collaboration, Aug. 5, 2013, Art. No. 4, pp. 1-10 [Retrieved on Nov. 3, 2023] <DOI: 10.1145/2491055.2491059> Section 1-4.1, 6.1.2, 6.2, Fig. 1, 2, 4-6.

(Continued)

*Primary Examiner* — Alazar Tilahun

(57) ABSTRACT

The present disclosure provides an information processing method and apparatus, and an electronic device. The method includes: displaying first information in response to a second user having generated second multimedia content using first multimedia content, where the first multimedia content is multimedia content published by a first user, and acquiring the second multimedia content in response to an operation on the first information and playing the second multimedia content, thus reducing the operation complexity of acquiring the second multimedia content.

19 Claims, 9 Drawing Sheets

(51) Int. Cl.
*G06Q 10/40* (2026.01)
*G06Q 10/46* (2026.01)
*H04N 21/442* (2011.01)

(58) Field of Classification Search
CPC ....... G06F 16/48; G06F 16/44; G06Q 10/101; G06Q 50/01; H04M 1/72403
See application file for complete search history.

(56) References Cited

U.S. PATENT DOCUMENTS

| | | | | |
|---|---|---|---|---|
| 2015/0200999 | A1* | 7/2015 | Chen | H04L 67/06 386/285 |
| 2017/0300570 | A1 | 10/2017 | Chiarandini et al. | |
| 2022/0319082 | A1* | 10/2022 | Boyd | G06Q 50/01 |

OTHER PUBLICATIONS

Smith J. B. L. et al., Classifying Derivative Works with Search, Text, Audio and Video Features. 2017 IEEE International Conference on Multimedia and Expo (/CME), Jul. 14, 2017 [Retrieved on Nov. 3, 2023] <DOI: 10.1109/ICME.2017.8019444> Entire document.
International Search Report mailed Nov. 16, 2023 in International Application No. PCT/sg2023/050325.
Anonymous: "YouTube Content ID", feiyr Blog, Mar. 2, 2021, pp. 1-2, Retrieved from the Internet: URL:https://web.archive.org/web/20210302142647/https:// blog.feiyr.com/en/youtube-content-id-2/.
European Search Report for EP Patent Application No. 23816472.7, Issued on May 4, 2026,8 pages.

* cited by examiner

INFORMATION PROCESSING METHOD, APPARATUS AND ELECTRONIC DEVICE

CROSS-REFERENCE TO RELATED APPLICATIONS

This application is a continuation of International Application No. PCT/SG2023/050325, filed on May 11, 2023, which claims priority to Indian patent application No. 202221030941, filed on May 30, 2022, and titled "INFORMATION PROCESSING METHOD, APPARATUS AND ELECTRONIC DEVICE", both of which are hereby incorporated by reference in their entireties.

TECHNICAL FIELD

Embodiments of the present disclosure relate to the field of information processing technologies, and in particular, to an information processing method and apparatus, and an electronic device.

BACKGROUND

After an original user publishes multimedia information (such as a piece of music) in an application, other users can use the multimedia information to generate new multimedia information (such as a video).

At present, the original user can browse videos published by other users (including the music published by the original user) and interact with other users. For example, the original user can enter user home pages of other users through multiple click operations, and acquire videos published by other users in the user home pages. However, the original user cannot timely acquire videos published by other users using the original user's music, and an operation of acquiring videos is more complex.

SUMMARY

The present disclosure provides an information processing method and apparatus, and an electronic device.

In a first aspect, the present disclosure provides an information processing method, and the method includes:

- displaying first information in response to a second user having generated second multimedia content using first multimedia content, where the first multimedia content is multimedia content published by a first user; and
- acquiring the second multimedia content in response to an operation on the first information and playing the second multimedia content.

In a second aspect, the present disclosure provides an information processing apparatus, and the information processing apparatus includes a displaying module, a responding module and a playing module, where:

- the displaying module is configured to display first information in response to second user having generated second multimedia content using first multimedia content, where the first multimedia content is multimedia content published by a first user;
- the responding module is configured to acquire the second multimedia content in response to an operation on the first information; and
- the playing module is configured to play the second multimedia content.

In a third aspect, an embodiment of the present disclosure provides an electronic device, including: a processor and a memory;

- the memory stores computer-executable instructions;
- the processor executes the computer-executable instructions stored in the memory, so that the processor executes the information processing method of the first aspect and various possibility involves in the first aspect.

In a fourth aspect, an embodiment of the present disclosure provides a computer-readable storage medium, where the computer readable storage medium stores computer executable instructions, and when a processor executes the computer-executable instructions, the information processing method described above in the first aspect and various possibility involves in the first aspect are implemented.

In a fifth aspect, an embodiment of the present disclosure provides a computer program product, including a computer program, which, when executed by a processor, the information processing method of the first aspect and various possibility involves in the first aspect are implemented.

In a sixth aspect, an embodiment of the present disclosure provides a computer program, the computer program is used to implement the information processing method of the first aspect and various possibility involves in the first aspect.

The present disclosure provides an information processing method and apparatus, and electronic device. The electronic device displays first information in response to a second user having generated second multimedia content using first multimedia content, where the first multimedia content is multimedia content published by a first user, and acquires the second multimedia content in response to an operation on the first information and plays the second multimedia content. In the above method, since the first information may indicate that the second user has generated the second multimedia content using the first multimedia content, and the first multimedia content is information published by the first user, therefore, according to the first information, the first user may timely acquire publication information of the second multimedia content, and acquire the second multimedia content (multimedia content generated from the first multimedia content) published by the second user through a click operation on the first information.

BRIEF DESCRIPTION OF DRAWINGS

In order to illustrate technical solutions in embodiments of the present disclosure or the prior art more clearly, accompanying drawings that need to be used in description of the embodiments or the prior art will be briefly introduced below. It is obvious that the accompanying drawings in the following description are some embodiments of the present disclosure, and for those of ordinary skill in the art, other accompanying drawings may also be acquired according to these accompanying drawings without paying any creative efforts.

DESCRIPTION OF EMBODIMENTS

Figure 1:
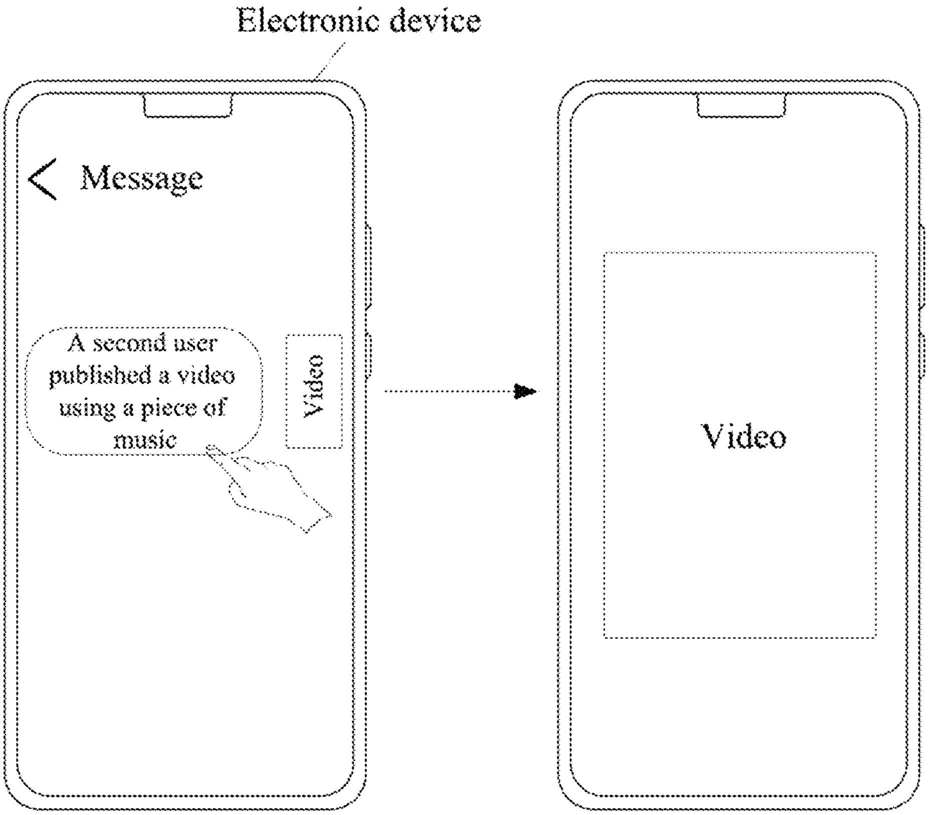
FIG. 1 is a schematic diagram of an application scenario according to an embodiment of the present disclosure.

Exemplary embodiments will be described in detail herein, examples of which are illustrated in the accompanying drawings. When the following description relates to the accompanying drawings, unless otherwise indicated, same numerals in different accompanying drawings represent a same or similar element. The implementations described in the following exemplary embodiments do not represent all embodiments consistent with the present disclosure. On the contrary, they are merely examples of apparatuses and methods consistent with some aspects of the present disclosure as detailed in the appended claims.

It should be noted that, herein, the terms "comprise", "include" or any other variation thereof are intended to cover non-exclusive inclusion, such that a process, method, article or apparatus including a series of elements includes not only those elements, but also other elements not explicitly listed, or elements inherent in such process, method, article or apparatus. Without further limitation, an element defined by the statement "including a . . . " does not exclude an existence of another same element in the process, method, article or apparatus including the element.

For ease of understanding, the concepts involved in the embodiments of the present disclosure are first described.

Electronic device: it is a kind of device with wireless transceiver function. An electronic device may be deployed on land, including indoor or outdoor, handheld, wearable or vehicle-mounted; it may also be deployed on water (such as a ship, etc.). The electronic device may be a mobile phone (mobile phone), a pad (Pad), a computer with wireless transceiver function, a virtual reality (virtual reality, VR) electronic device, an augmented reality (augmented reality, AR) electronic device, a wireless terminal in industrial control (industrial control), a vehicle-mounted electronic device, a wireless terminal in self driving (self driving), a wireless electronic device in remote medicinal (remote medicinal), a wireless electronic device in smart grid (smart grid), a wireless electronic device in transportation safety (transportation safety), a wireless electronic device in smart city (smart city), a wireless electronic device in smart home (smart home), a wearable electronic device, etc. The electronic device involved in the embodiments of the present disclosure can also be called a terminal, a user equipment (user equipment, UE), an access electronic device, a vehicle-mounted terminal, an industrial control terminal, a UE unit, a UE station, a mobile station, a mobile platform, a remote station, a remote electronic device, a mobile device, a UE electronic device, a wireless communication device, a UE agent or a UE apparatus, etc. The electronic device may also be fixed or mobile.

In related art, after an original user publishes a music in an application, other users can use the music to generate videos, and the original user can interact with other users through the videos published by other users. At present, the original user can enter user home pages of other users through multiple clicks, and acquire videos published by other users in the user home pages. For example, the original user first acquires a user who uses the music through multiple click operations in the application, then clicks to enter the user's user home page, and finally acquires a video generated using the original user's music in the user home page. In this way, the complexity of the operation is relatively high.

In order to solve the technical problem that the complexity of the operation is relatively high in the related art, an embodiment of the present disclosure provides an information processing method, in which an electronic device displays first information in response to a second user having generated second multimedia content using first multimedia content, where the first multimedia content is multimedia content published by a first user, and in response to an operation on the first information, acquires the number of the second user, acquires the second multimedia content generated by the second user using the first multimedia content if the number of the second user is 1, and generates a first page and displays the first page if the number of the second users is greater than 1; and acquires the second multimedia content in response to an operation on the first page, and plays the second multimedia content. In the above method, when the second user generates the second multimedia content using the first multimedia content, the first user may timely acquire publication information of the second multimedia content, if the number of the second user is 1, the first user may perform a click operation on the first information, so that the electronic device acquires the second multimedia content, if the number of the second users is greater than 1, the electronic device displays the first page, and acquires the second multimedia content through the first user's click operation on the first page. Therefore, the first user can acquire the second multimedia content published by the second user through at most two click operations, thereby reducing the complexity of the operation.

Hereinafter, in combination with FIG. 1, an application scenario of an embodiment of the present disclosure will be described.

FIG. 1 is a schematic diagram of an application scenario according to an embodiment of the present disclosure. Please refer to FIG. 1, including an electronic device. In response to information that the second user has generated a video using a piece of music published by a first user, an electronic device may display first information. The first information is "a second user published a video using a piece of music" and an identifier of the video, and the music is the music published by the first user. When the first user clicks on the first information, the electronic device acquires the video and plays the video on a display page. In this way, the first user can timely acquire the information that a video has been published by the second user, and by a click operation on the first information, the electronic device may acquire the video generated through music and play the video, so as to reduce an operation complexity of acquiring the video by the first user.

The technical solutions of the present disclosure and how the technical solutions of the present disclosure solve the above technical problem will be described in detail below with specific embodiments. The following specific embodiments may be combined with each other, and the same or similar concepts or processes may not be repeated in some embodiments. Embodiments of the present disclosure will be described below with reference to the accompanying drawings.

Figure 2:
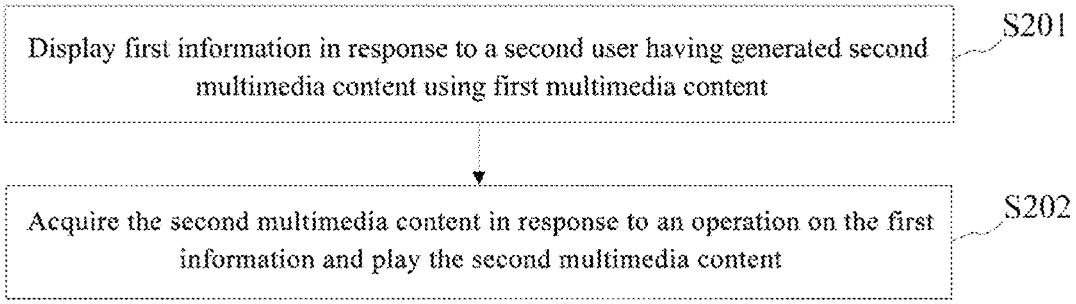
FIG. 2 is a schematic flowchart of an information processing method according to an embodiment of the present disclosure.

FIG. 2 is a schematic flowchart of an information processing method according to an embodiment of the present disclosure. Please refer to FIG. 2, the method may include:

S201, displaying first information in response to a second user having generated second multimedia content using first multimedia content.

The execution subject of the embodiment of the present disclosure may be an electronic device or an information processing apparatus arranged in the electronic device. The information processing apparatus may be realized by software, and the information processing apparatus may also be realized by a combination of software and hardware.

In an implementation, the first information is used to indicate that the second user has generated second multimedia content using first multimedia content. In an implementation, the first multimedia content is multimedia content published by a first user. For example, the first multimedia content may be a piece of music, an audio, a video and other multimedia content published by the first user.

In an implementation, the second multimedia content may be multimedia content published by the second user. For example, the second multimedia content may be a video published by the second user. The second multimedia content may include the first multimedia content. For example, when the first multimedia content is a piece of music, the second multimedia content may be a video including the music. For example, when the second multimedia content published by the second user is a video, the background music of the video may be the music published by the first user.

In an implementation, the first information may include an identifier of the second user and an identifier of the first multimedia content. For example, the first information may include a user name of the second user and the music published by the first user used by the second user for publishing the video. For example, the first information can be "User A, User B and User C generates videos using the music", in which the music is a piece of music published by the first user. In this way, when an electronic device of the first user receives a response message sent by an electronic device of the second user, the first user can timely determine that the second user has generated the second multimedia content using the first multimedia content, further, an efficiency of an interaction between the first user and the second user can be improved.

In an implementation, when the second user publishes the second multimedia content, the electronic device used by the second user may send relevant information of the second multimedia content to a server, and the server may send a response message to the first user according to the relevant information to inform the first user that the second user has generated and published the second multimedia content using the first multimedia content. For example, when the second user publishes a video (the background music of the video is the piece of music published by the first user), the electronic device may upload video information of the video to the server (e.g., the background music of the video, the information of the user who published the background music, etc.), and the server sends a response message to a corresponding first user according to the video information (e.g., the background music of the video published by the second user is the piece of music published by the first user), so that the electronic device of the first user displays the first information. In an implementation, the response message may be the same as the first information, or may be different from the first information, which is not limited in the embodiment of the present disclosure.

Hereinafter, in combination with FIG. 3, a process of "in response to a second user having generated second multimedia content using first multimedia content" will be described.

Figure 3:
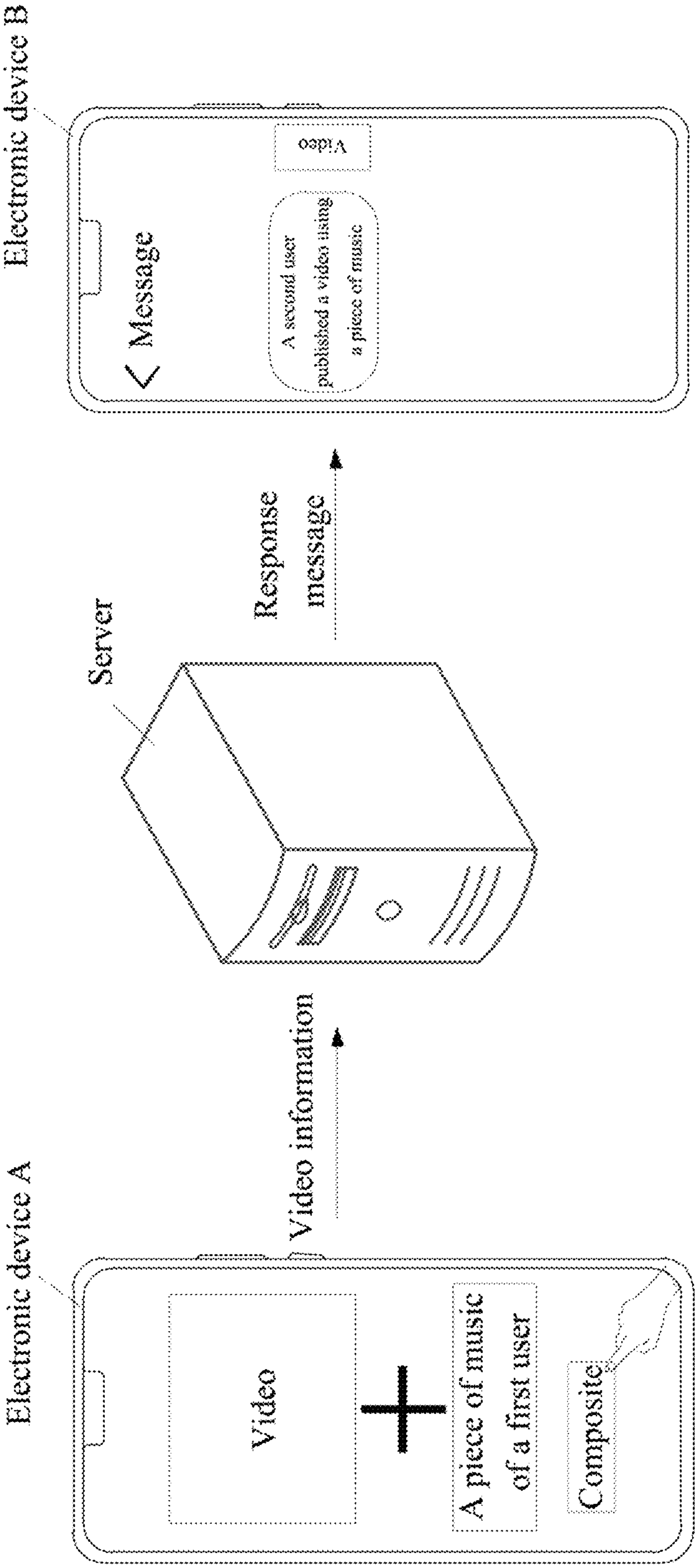
FIG. 3 is a schematic process diagram of a process for acquiring a response message according to an embodiment of the present disclosure.

FIG. 3 is a schematic process diagram of a process for acquiring a response message according to an embodiment of the present disclosure. Please refer to FIG. 3, including an electronic device A, an electronic device B, and a server. The electronic device A is an electronic device used by a second user, and the electronic device B is an electronic device used by a first user. When the second user uses a video and a piece of music of the first user to generate a new video in the electronic device A, the electronic device A may send video information of the new video to the server. When the server receives the video information, it may send a response message to the electronic device B according to the video information. When the electronic device B receives the response message, it can display a message of "a second user published a video using a piece of music" and an icon of the video in a message page of the first user.

In an implementation, the electronic device may display the first information in response to the second user having generated the second multimedia content using the first multimedia content. In an implementation, the electronic device may display the first information according to the following two feasible implementation.

One feasible implementation:

displaying the first information on a lock screen page of the electronic device. For example, if the electronic device used by the first user is in a screen-off mode or a screen-locking mode, the electronic device may display the first information on the lock screen page in response to the second user having generated the second multimedia content using the first multimedia content.

In an implementation, when the number of the second users is greater than or equal to a preset threshold, the first information may be displayed on a lock screen page of the electronic device. For example, when the electronic device used by the first user is in the screen-off mode, if 10 second users generate corresponding videos using the music published by the first user, the first information may be displayed on the lock screen page of the electronic device used by the first user; if one second user generates a video using music published by the first user, the first information is not displayed on the lock screen page of the electronic device.

Hereinafter, in combination with FIG. 4A, a process of displaying first information on a lock screen page of an electronic device will be described in detail.

Figure 4A:
FIG. 4A is a schematic diagram of displaying first information according to an embodiment of the present disclosure.

FIG. 4A is a schematic diagram of displaying first information according to an embodiment of the present disclosure. Please refer to FIG. 4A, including an electronic device. A display page of the electronic device is a lock screen page. If 10 second users generate corresponding videos using the music published by the first user, the electronic device may receive a response message sent by a server. The electronic device may display a message of "10 users has created videos using the music published by you" on the lock screen page according to the response message. When the user clicks this message, 10 videos can be acquired.

Another feasible implementation:

displaying the first information on a user page of the first user. For example, if a page displayed by the electronic device of the first user is the user page of the first user, the electronic device may display the first information on the user page in response to the second user having generated the second multimedia content using the first multimedia content.

Hereinafter, in combination with FIG. 4B, a page displaying the first information will be described.

Figure 4B:
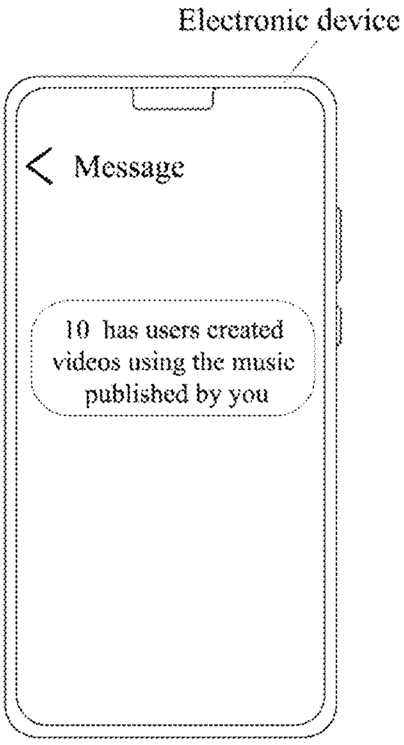
FIG. 4B is another schematic diagram of displaying first information according to an embodiment of the present disclosure.

FIG. 4B is another schematic diagram of displaying first information according to an embodiment of the present disclosure. In the embodiment shown in FIG. 4B, the number of second users is 10, please refer to FIG. 4B, including an electronic device. When the electronic device determines that a plurality of second users have generated videos using a piece of music published by the first user, the electronic device may display a message of "10 has users created videos using the music published by you" in the message page. When the first user clicks on the first information, the electronic device may acquire the videos published by the second users.

S202, acquiring the second multimedia content in response to an operation on the first information and playing the second multimedia content.

In an implementation, the operation on the first information may be a click operation. For example, the electronic device may acquire the second multimedia content published by the second user in response to the first user's click operation on the first information.

In an implementation, the second multimedia content may be acquired according to the following feasible implementation: acquiring the number of the second user(s), and acquiring the second multimedia content according to the number of second user(s). For example, if one second user generates a corresponding video using the music of the first user, the electronic device determines that the number of the second user is 1; if 10 second users generate corresponding videos using the music of the first user, the electronic device determines that the number of the second users is 10.

In an implementation, acquiring the second multimedia content according to the number of the second user(s) may has following two cases.

Case 1: the number of the second user is 1.

If the number of the second user is 1, the second multimedia content generated by the second user using the first multimedia content is acquired. For example, if the number of the second user is 1, when the first user clicks on the first information, the electronic device may acquire the video published by the second user using the music of the first user.

In an implementation, when the electronic device used by the first user acquires the second multimedia content, the electronic device may play the second multimedia content. For example, when the number of the second user is 1, the second user generates one video using the music published by the first user. When the first user clicks on the first information, the electronic device may acquire the video and play the video. In this case, the first user may acquire the second multimedia content published by the second user through a single click operation on the first information, thereby reducing the complexity of the operation.

Case 2: the number of the second users is greater than 1.

If the number of the second users is greater than 1, a first page is generated and displayed. In response to an operation on the first page, the second multimedia content is acquired. For example, the first page may include identifiers of a plurality of second users. When the first user clicks an identifier of a second user, the electronic device may acquire a video published by said second user (the video includes the music published by the first user).

In an implementation, the first page includes a first area and a second area. The first page can be generated according to the following feasible implementation: acquiring a first parameter corresponding to each of the second users. The first parameter includes at least one of the following: time when the second user publishes the second multimedia content, a popularity of the second user, and view counts of the second multimedia content.

In an implementation, the popularity of the second user may be a popularity of the second user in an application. For example, if 100 users follow the second user, the popularity of the second user can be 100. If 1000 users browse the video published by the second user, the popularity of the second user may be 1000. It should be noted that the popularity of the second user may include the popularity of multimedia content published by the second user, attention of the second user in the application, etc. the embodiment of the present disclosure is not limited thereto.

In an implementation, the view counts of the second multimedia content may be the number of browses of the second multimedia content. For example, if the number of browses of the video published by the second user is 10,000 times, the view counts of the video is 10,000 times; if the number of browses of the video published by the second user is 1 million times, the view counts of the video is 1 million times.

In an implementation, the view counts of the second multimedia content may be the number of likes of the second multimedia content. For example, after other users browse the second multimedia content, they may give likes to the second multimedia content, and each user may give a like to the second multimedia content once. For example, if the number of likes of the second multimedia content published by the second user is 10,000 times, the view counts of the second multimedia content is 10,000 times, and if the number of likes of the second multimedia content is 100,000 times, the view counts of the second multimedia content is 100,000 times.

Generate an identifier of the first multimedia content in the first area, and generate identifiers and/or first parameters of a plurality of second users in the second area to obtain the first page. For example, the electronic device may generate a music icon published by the first user in the first area, and generate identifiers of the plurality of second users, the number of likes of the videos published by the second users, the popularity of the second users and other information in the second area, and then obtain the first page.

Hereinafter, in combination with FIG. 5, a first page will be described in detail.

Figure 5:
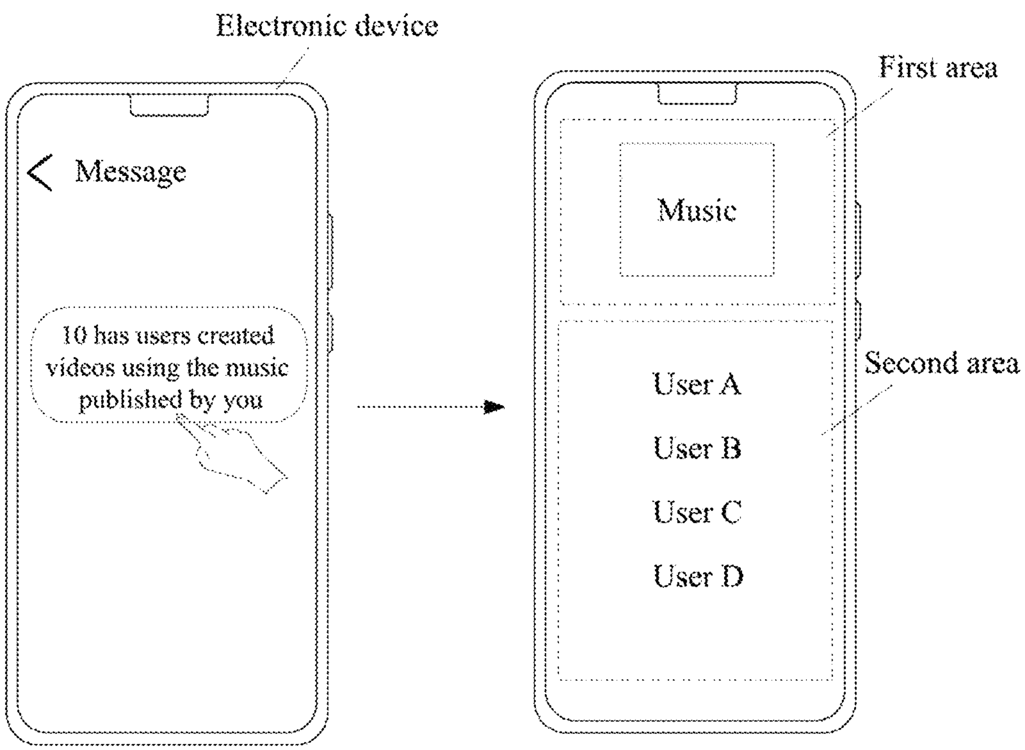
FIG. 5 is a schematic diagram of a first page according to an embodiment of the present disclosure.

FIG. 5 is a schematic diagram of a first page according to an embodiment of the present disclosure. Please refer to FIG. 5, including an electronic device. A message page of the electronic device displays first information "10 has users created videos using the music published by you". When a first user clicks on the first information, the electronic device displays a first page which includes a first area and a second area. The first area includes an identifier of the music published by the first user, and the second area includes identifiers of 10 users including User A, User B, User C and User D, etc.

In an implementation, an operation performed by a first user on a first page may be an operation performed on an identifier of first multimedia content or an operation performed on an identifier of the second user, where the acquiring the second multimedia content in response to an operation on the first page is specifically: if the operation on the first page is an operation on the identifier of the first multimedia content, displaying a second page. The second page includes identifiers of a plurality pieces of second multimedia content, and in response to the operation on the identifiers of the second multimedia content, the second multimedia content is acquired. For example, if the first user clicks a music icon in the first area, the electronic device displays the second page, and the second page includes a plurality of video icons using the music. After the first user clicks any one of the video icons, the electronic device acquires the video, and plays the video.

If the operation on the first page is an operation on the identifier of the second user, the second multimedia content generated by the second user using the first multimedia content is acquired. For example, if the first user clicks an identifier of User A in the second area, the electronic device acquires a video published by User A using the music of the first user; if the first user clicks an identifier of User B in the second area, the electronic device acquires a video published by User B using the music of the first user.

Hereinafter, in combination with FIGS. 6A-6B, a process for acquiring second multimedia content in this case will be described.

Figure 6A:
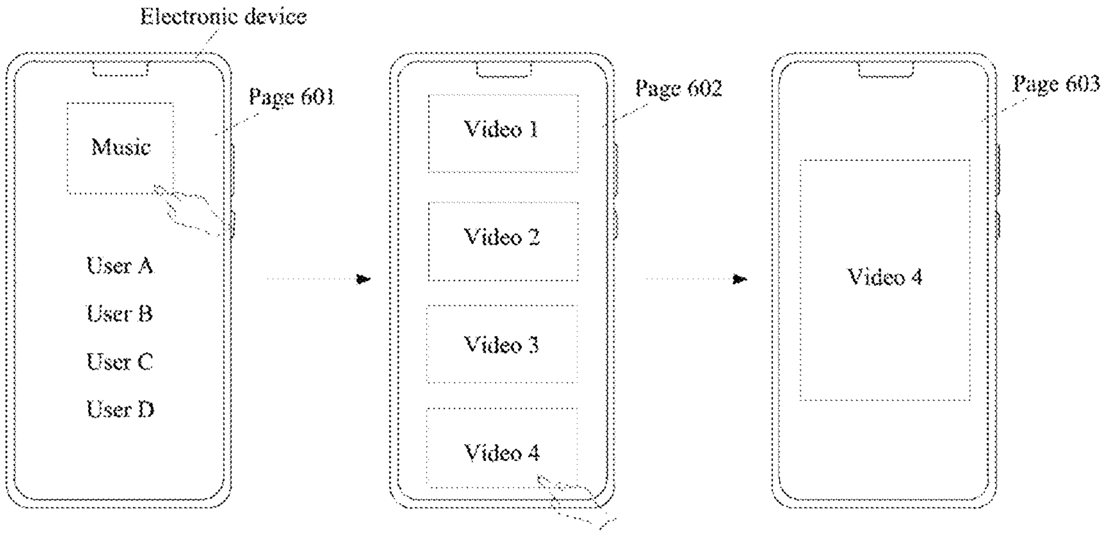
FIG. 6A is a schematic diagram of a process for acquiring second multimedia information according to an embodiment of the present disclosure.

FIG. 6A is a schematic diagram of a process for acquiring second multimedia information according to an embodiment of the present disclosure. Please refer to FIG. 6A, including an electronic device. A display page of the electronic device is a page 601 (a first page). The page 601 includes an icon of a piece of music, an icon of User A, an icon of User B, an icon of User C, and an icon of User D.

Please refer to FIG. 6A, when the first user clicks a music icon, a display page of the electronic device jumps from the page 601 to a page 602 (a second page). The page 602 includes an icon of a video 1, an icon of a video 2, an icon of a video 3, and an icon of a video 4. The video 1 is a video generated by User A using music, the video 2 is a video generated by User B using music, the video 3 is a video generated by User C using music, and the video 4 is a video generated by User D using music. When the first user clicks on the icon of the video 4, the display page of the electronic device jumps from the page 602 to a page 603. The page 603 plays the video 4.

Figure 6B:
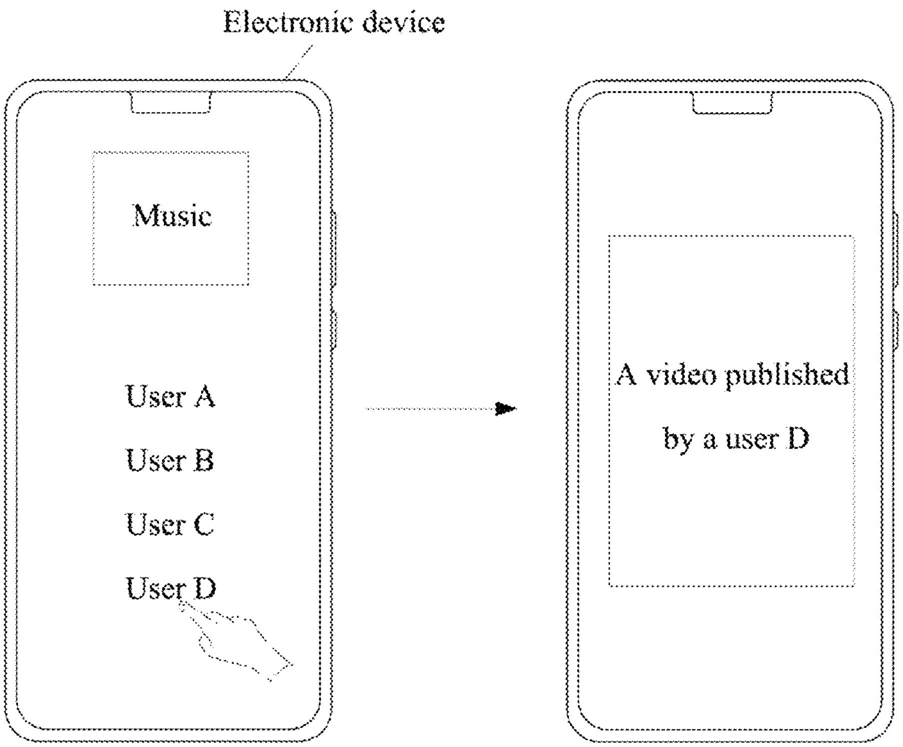
FIG. 6B is another schematic diagram of a process for acquiring second multimedia information according to an embodiment of the present disclosure.

FIG. 6B is another schematic diagram of a process for acquiring second multimedia information according to an embodiment of the present disclosure. Please refer to FIG. 6B, including an electronic device. A display page of the electronic device is a first page. The first page includes an icon of a piece of music, an icon of User A, an icon of User B, an icon of User C, and an icon of User D. When the first user clicks on the icon of User D, the electronic device acquires a video published by User D using the music, and plays the video published by User D on the display page.

In this case, when the number of second users is relatively large, the first user may click the first information to generate the first page, and the first user may obtain different second multimedia content through different click operations, so as to improve the flexibility of acquiring the second multimedia content.

The embodiment of the present disclosure provides an information processing method. An electronic device displays first information on a lock screen page or a user page of a first user in response to a second user having generated second multimedia content using first multimedia content, and acquires the number of the second user(s) in response to an operation on the first information, acquires the second multimedia content generated by the second user using the first multimedia content if the number of the second user is 1, and generates a first page and displays the first page if the number of the second users is greater than 1; and acquires the second multimedia content in response to an operation on the first page, and plays the second multimedia content. In the above method, when the second user generates the second multimedia content using the first multimedia content, the first user may timely acquire publication information of the second multimedia content. By clicking on the first information at most twice, the first user enables the electronic device to acquire the second multimedia content published by the second user and play the second multimedia content, thus reducing the operation complexity of acquiring the second multimedia content.

On the basis of the embodiment shown in FIG. 2, when generating the first page, it is necessary to generate identifiers and/or first parameters of a plurality of second users in the second area of the first page. Hereinafter, in combination with FIG. 7, a method of generating the identifiers and/or the first parameters of the plurality of second users in the second area will be described.

Figure 7:
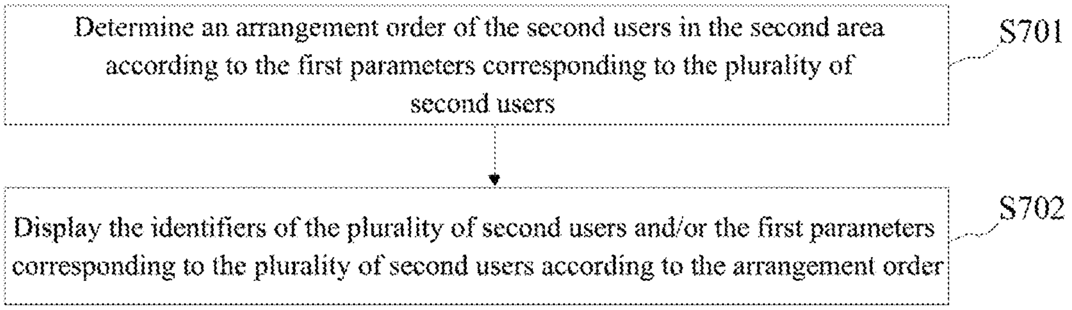
FIG. 7 is a schematic diagram of a method for generating a second area of a first page according to an embodiment of the present disclosure.

FIG. 7 is a schematic diagram of a method for generating a second area of a first page according to an embodiment of the present disclosure. Please refer to FIG. 7, the method flow includes:

S701, determining an arrangement order of the second users in the second area according to the first parameters corresponding to the plurality of second users.

In an implementation, the arrangement order may be an arrangement order of the second users in the second area. For example, in the second area, identifiers of the plurality of second users and first parameters corresponding to the second users are arranged in the second area from high to low in the arrangement order.

In an implementation, the arrangement order of the second users in the second area may be determined according to the following two feasible implementations.

One feasible implementation:

the first parameter is time when the second user publishes the second multimedia content, where the determining an arrangement order of the second users in the second area according to the first parameters corresponding to the plurality of second users is specifically: acquiring time differences between the time when the second users publish the second multimedia content and a current moment. For example, if a video A was published 30 minutes ago, the time difference of the video A is 0.5 hours; if a video B was published 2 hours ago, the time difference of the video B is 2 hours.

Sorting the time differences in an order from small to large to obtain a first order. For example, if the time differences include 0.5 hours, 1.5 hours, 2 hours, and 1 hour, the first order may be 0.5 hours, 1 hour, 1.5 hours, and 2 hours.

Determining the first order as the arrangement order of the second users in the second area. For example, if the time difference of the video A is 1 hour and the time difference of the video B is 2 hours, the first order is 1 hour, 2 hours, and an order of a second user who published the video A is before a second user who published the video B.

Hereinafter, in combination with FIG. 8, a process of this arrangement order will be described.

Figure 8:
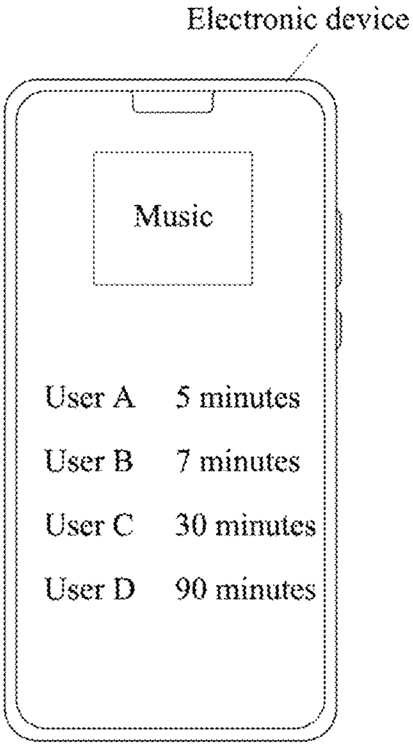
FIG. 8 is a schematic diagram of an arrangement order according to an embodiment of the present disclosure.

FIG. 8 is a schematic diagram of an arrangement order according to an embodiment of the present disclosure. Please refer to FIG. 8, including an electronic device. A display page of the electronic device is a first page. The first page includes an icon of a piece of music, an icon of User A, an icon of User B, an icon of User C, an icon of User D, and the time when each user published the video. Since User A published a video 5 minutes ago, User B published a video 7 minutes ago, User C published a video 30 minutes ago, and User D published a video 90 minutes ago, an order of the plurality of users on the first page is: User A, User B, User C, and User D.

In this feasible implementation, a plurality of second users are sorted by the time when the second users publish the second multimedia content, so that a first user may browse newly published second multimedia content, thus reducing an operation complexity of acquiring the second multimedia content by the first user, and improving an interaction effect between the first user and the second user.

Another feasible implementation:

determining arrangement parameters of the second users according to the first parameters corresponding to the second users; and determining the arrangement order of the second users in the second area according to the arrangement parameters. For example, the arrangement parameter may be an arrangement score of the second user in the second area, and the larger the arrangement parameter, the higher the order of the second user.

For any second user, the arrangement parameter of the second user may be determined according to the following feasible implementation: acquiring a first value corresponding to the time when the second user publishes the second multimedia content. For example, if a time difference between the time when the second user publishes the second multimedia content and the current moment is 30 minutes, the first value may be 60 (30*2), where the parameter 2 may be a preset parameter.

Acquire a second value corresponding to the popularity of the second user. For example, if a popularity of the second user is 10,000, the second value may be 100 (10000*0.01); if a popularity of the second user is 100,000, the second value may be 1000, where the parameter 0.01 may be a preset parameter.

Acquire a third value corresponding to the view counts of the second multimedia content. For example, if view counts of the second multimedia content is 10,000, the second value may be 200 (10000*0.02), and if the number of users who follow the second user is 100,000, the second value may be 2000, where the parameter 0.02 may be a preset parameter.

Acquiring the arrangement parameter of the second user according to at least one of the first value, the second value and the third value. For example, the electronic device may acquire the arrangement parameter of the second user according to any one or two of the first value, the second value and the third value, and may also acquire the arrangement parameter of the second user according to the first value, the second value and the third value. For example, the electronic device may determine any one of values as the arrangement parameter of the second user, may determine a weighted sum of any two or three values as the arrangement parameter of the second user, or may determine a sum of any two or three values as the arrangement parameter of the second user, which is not limited in the embodiment of the present disclosure.

In an implementation, the first value, the second value and the third value may be processed through a preset model to acquire the arrangement parameter of the second user. The preset model is obtained from learning a plurality of groups of samples. The plurality of groups of samples may be pre-labeled samples. For example, for a sample first value 1, a sample second value 1 and a sample third value 1, a corresponding sample arrangement parameter 1 is acquired to obtain a group of samples, which includes the sample first value 1, the sample second value 1, the sample third value 1 and the sample arrangement parameter 1. In this way, the plurality of groups of samples may be obtained.

In an implementation, the determining the arrangement order of the second users in the second area according to the arrangement parameters is specifically: arranging the arrangement parameters of the second users in an order from large to small to obtain the arrangement order of the second users in the second area. For example, if an arrangement parameter of a second user A is 100, an arrangement parameter of a second user B is 200, and an arrangement parameter of a second user C is 50, an arrangement order of the second users in the second area is: the second user B, the second user A, and the second user C.

In this feasible implementation, the arrangement parameter of each second user may be obtained by the first parameter of each second user, and then the second users can be sorted by the arrangement parameters. In this way, a plurality of parameters may be taken into account comprehensively for sorting of the second users, thereby improving a sorting accuracy of the second users in the second area, and improving the interaction between the first user and the second user.

S702, displaying the identifiers of the plurality of second users and/or the first parameters corresponding to the plurality of second users according to the arrangement order.

In an implementation, according to the arrangement order, the identifiers of the plurality of second users may be displayed in the second area, or the first parameters corresponding to the plurality of the second users may also be displayed in the second area, or, the identifiers of the plurality of second users and the first parameters corresponding to the second users may be displayed in the second area. For example, according to the arrangement order, an electronic device may display profile pictures of second users, the popularity of the second users, the view counts of the second multimedia content, and the like in the second area.

Hereinafter, in combination with FIG. 9, a second area of a first page will be described.

Figure 9:
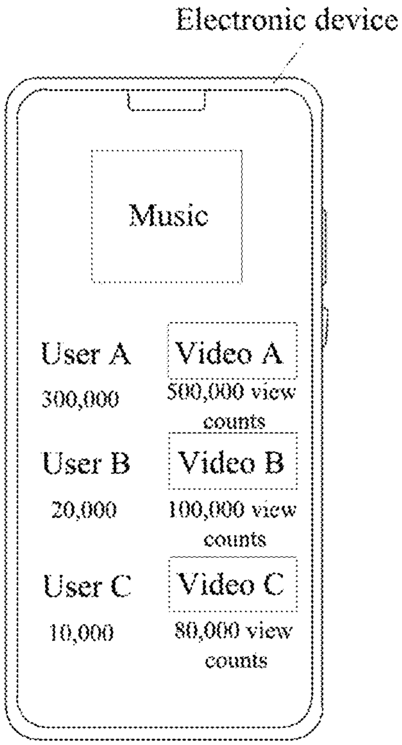
FIG. 9 is a schematic diagram of a second area according to an embodiment of the present disclosure.

FIG. 9 is a schematic diagram of a second area according to an embodiment of the present disclosure. Please refer to FIG. 9, including an electronic device. A display page of the electronic device is a first page. A first area of the first page displays an icon of a piece of music, and a second area of the first page displays icons of users and first parameters corresponding to the users. For example, the second area displays an icon of User A, a popularity of User A is 300,000, view counts of a video A published by User A is 500,000, an icon of User B, a popularity of User B is 20,000, view counts of a video B published by User B is 100,000, an icon of User C, a popularity of User C is 10,000, and view counts of a video C published by User C is 80,000.

The embodiment of the present disclosure provides a method for generating a second area of a first page, where an arrangement order of the second users in the second area is determined according to the first parameters corresponding to the plurality of second users, and identifiers of the plurality of second users and/or the first parameters corresponding to the plurality of second users are displayed according to the arrangement order. In this way, an electronic device may sort the second users according to the plurality of first parameters of the second users, thereby improving an accuracy of sorting the second users in the second area, reducing the operation complexity of acquiring the second multimedia content by the first user, and improving the interaction effect between the first user and the second user.

On the basis of any one of the above embodiments, the above method embodiment further includes a process for sending prompt information to the second user. Hereinafter, in combination with FIG. 10, a method for sending prompt information will be described.

Figure 10:
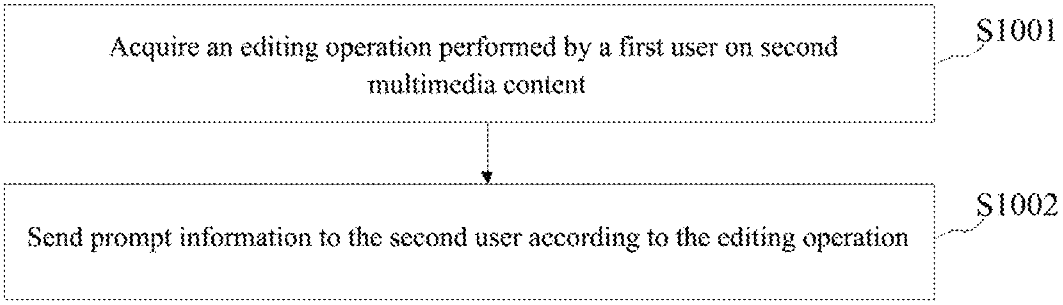
FIG. 10 is a schematic flowchart of a method for sending prompt information according to an embodiment of the present disclosure.

FIG. 10 is a schematic flowchart of a method for sending prompt information according to an embodiment of the present disclosure. Please refer to FIG. 10, the method flow includes:

S1001, acquiring an editing operation performed by a first user on second multimedia content.

In an implementation, the editing operation may be an operation performed by the first user on the second multimedia content. For example, the first user may perform forwarding, commenting, liking and other operations on the second multimedia content. For example, when the first user browses a video, if the first user forwards the video, the editing operation of the first user on the second multimedia content is forwarding; if the first user comments on the video, the editing operation of the first user on the second multimedia content is commenting.

S1002, sending prompt information to the second user according to the editing operation.

In an implementation, after acquiring the editing operation performed by the first user on the second multimedia content, the electronic device may send prompt information to the second user who published the second multimedia content, so that the second user may timely acquire editing information of the first user. For example, if the first user comments on the second multimedia content, an electronic device used by the first user sends prompt information of "the first user has commented on the second multimedia content" to an electronic device used by the second user.

Hereinafter, in combination with FIG. 11, a process for sending prompt information to a second user will be described.

Figure 11:
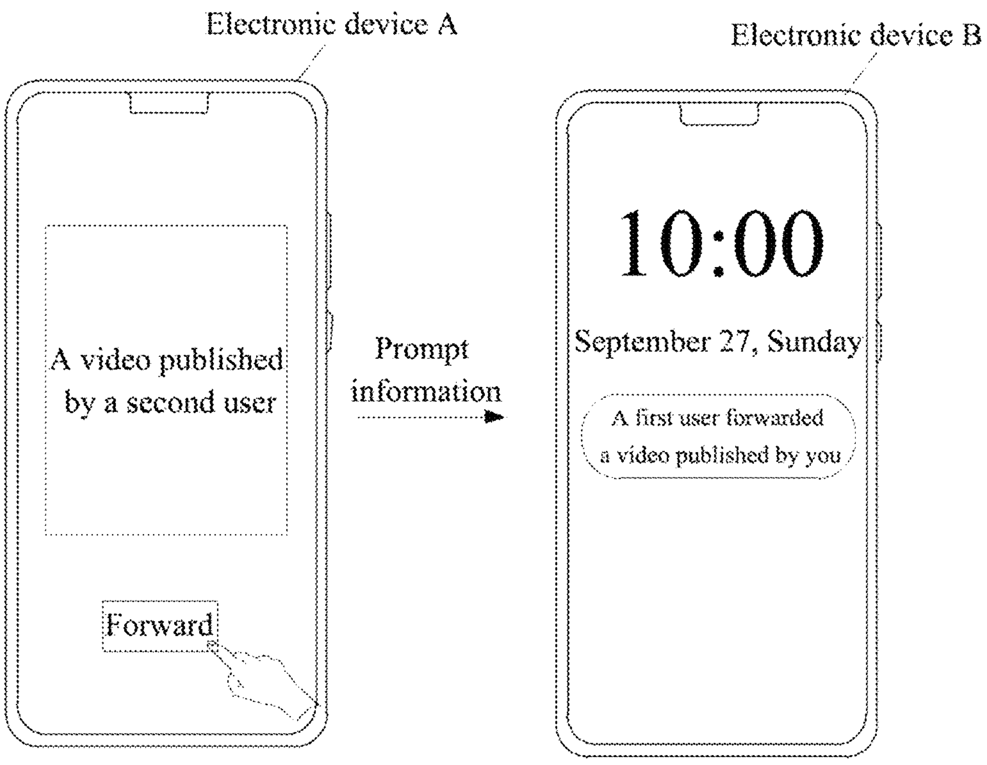
FIG. 11 is a schematic diagram of a process for sending prompt information according to an embodiment of the present disclosure.

FIG. 11 is a schematic diagram of a process for sending prompt information according to an embodiment of the present disclosure. Please refer to FIG. 11, including an electronic device A and an electronic device B. The electronic device A is an electronic device used by a first user, and the electronic device B is an electronic device used by a second user. The electronic device A displays a video published by the second user, and when the first user clicks a forward icon, the electronic device A sends prompt information to the electronic device B used by the second user. When the electronic device B receives the prompt information, it may display a message of "A first user forwarded a video published by you" on a lock screen page. In this way, the second user may timely acquire the editing operation performed by the first user on the second multimedia content, thereby improving the effect of user interaction.

The embodiment of the present disclosure provides a method for sending prompt information, where an editing operation performed by the first user on the second multimedia content is acquired, and prompt information is sent to the second user according to the editing operation. In this way, the second user may timely acquire the editing operation performed by the first user on the second multimedia content, and the electronic device of the second user may display the editing operation through click on the prompt information, thereby reducing the complexity of the operation, and improving the interaction efficiency and interaction effect between the first user and the second user.

Figure 12:
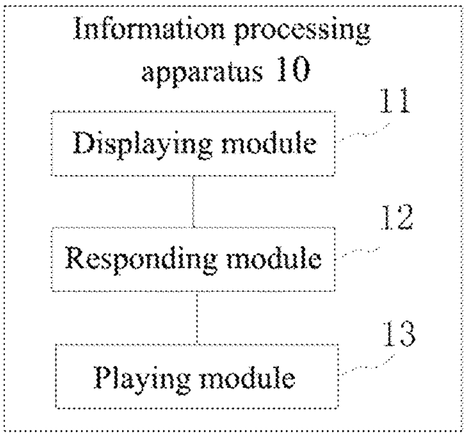
FIG. 12 is a schematic structural diagram of an information processing apparatus according to an embodiment of the present disclosure.

FIG. 12 is a schematic structural diagram of an information processing apparatus according to an embodiment of the present disclosure. Please refer to FIG. 12, the information processing apparatus 19 includes a displaying module 11, a responding module 12 and a playing module 13, where:

the displaying module 11 is configured to display first information in response to second user having generated second multimedia content using first multimedia content, where the first multimedia content is multimedia content published by a first user;

the responding module 12 is configured to acquire the second multimedia content in response to an operation on the first information; and the playing module 13 is configured to play the second multimedia content.

In a possible implementation, the responding module 12 is specifically configured to:

acquire the number of the second user; and acquire the second multimedia content according to the number of the second user.

In a possible implementation, the responding module 12 is specifically configured to:

if the number of the second user is 1, acquire the second multimedia content generated by the second user using the first multimedia content.

In a possible implementation, the responding module 12 is specifically configured to:

if the number of the second user is greater than 1, generate a first page and display the first page; and acquire the second multimedia content in response to an operation on the first page.

In a possible implementation, the responding module 12 is specifically configured to:

acquire a first parameter corresponding to each of the second user, where the first parameter includes at least one of the following: time when the second user publishes the second multimedia content, a popularity of the second user, and view counts of the second multimedia content; and generate an identifier of the first multimedia content in the first area, and generate identifiers and/or first parameters of a plurality of second users in the second area to obtain the first page.

In a possible implementation, the responding module 12 is specifically configured to:

determine an arrangement order of the second users in the second area according to the first parameters corresponding to the plurality of second users; and display the identifiers of the plurality of second users and/or the first parameters corresponding to the plurality of second users according to the arrangement order.

In a possible implementation, the responding module 12 is specifically configured to:

acquire time differences between the time when the second users publish the second multimedia content and a current moment;

sort the time differences in an order from small to large to obtain a first order; and determine the first order as the arrangement order of the second users in the second area.

In a possible implementation, the responding module 12 is specifically configured to:

determine arrangement parameters of the second users according to the first parameters corresponding to the second users; and determine the arrangement order of the second users in the second area according to the arrangement parameters.

In a possible implementation, the responding module 12 is specifically configured to:

acquire a first value corresponding to the time when the second user publishes the second multimedia content;

acquire a second value corresponding to the popularity of the second user;

acquire a third value corresponding to the view counts of the second multimedia content; and acquire the arrangement parameter of the second user according to at least one of the first value, the second value and the third value.

In a possible implementation, the responding module 12 is specifically configured to:

display a second page if the operation on the first page is an operation on the identifier of the first multimedia content, where the second page includes identifiers of a plurality pieces of second multimedia content, and acquiring the second multimedia content in response to the operation on the identifier of the second multimedia content; and acquire the second multimedia content generated by the second user using the first multimedia content if the operation on the first page is an operation on the identifier of the second user.

In a possible implementation, the displaying module 11 is specifically configured to:

display the first information on a lock screen page of an electronic device; or, display the first information on a user page of the first user.

The information processing apparatus provided by the present embodiment can be used to perform the technical solutions of the above method embodiments, implementation principles and technical effects thereof are similar, and will not be repeated in the present embodiment herein.

Figure 13:
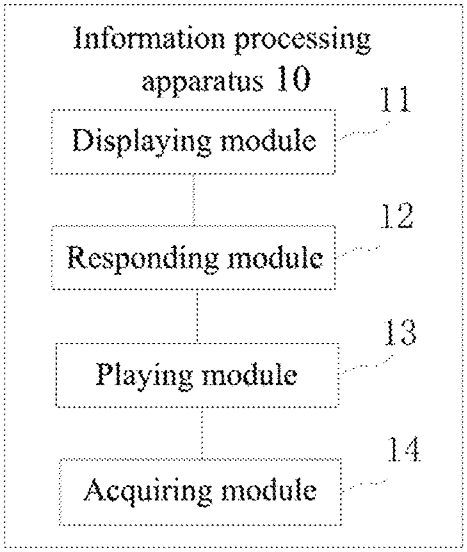
FIG. 13 is a schematic structural diagram of another information processing apparatus according to an embodiment of the present disclosure.

FIG. 13 is a schematic structural diagram of another information processing apparatus according to an embodiment of the present disclosure. On the basis of the embodiment shown in FIG. 12, please refer to FIG. 13, the information processing apparatus 10 further includes an acquiring module 14, and the acquiring module 14 is configured to:

acquire an editing operation performed by the first user on the second multimedia content; and send prompt information to the second user according to the editing operation.

The information processing apparatus provided by the present embodiment can be used to perform the technical solutions of the above method embodiments, implementation principles and technical effects thereof are similar, and will not be repeated in the present embodiment herein.

Figure 14:
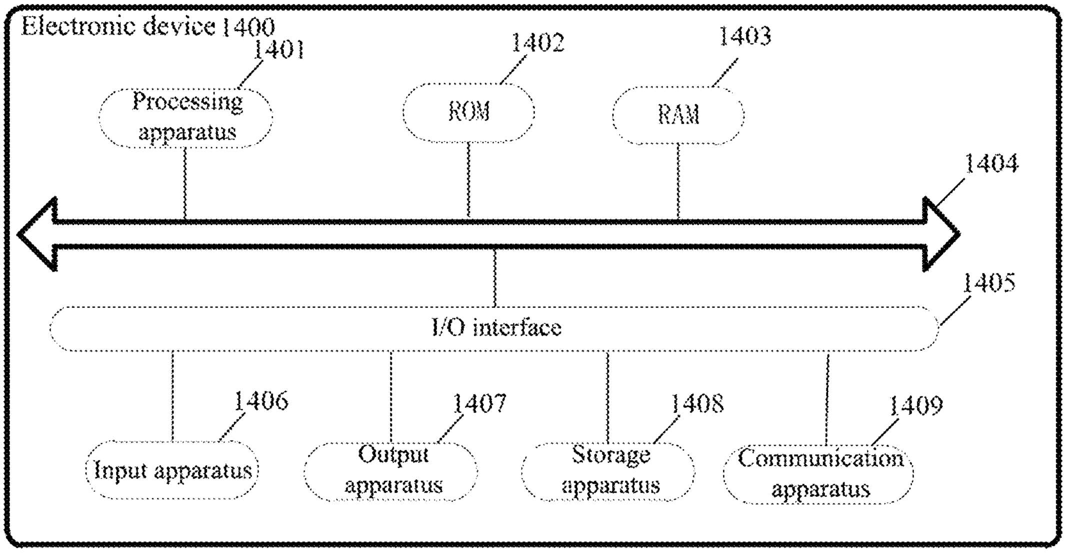
FIG. 14 is a schematic structural diagram of an electronic device according to an embodiment of the present disclosure.

FIG. 14 is a schematic structural diagram of an electronic device according to an embodiment of the present disclosure. Please refer to FIG. 14, it shows a structural schematic diagram of an electronic device 1400 suitable for implementing the embodiments of the present disclosure, and the electronic device 1400 may be a terminal device or a server. The terminal device may include, but is not limited to, a mobile terminal, such as a mobile phone, a notebook computer, a digital broadcast receiver, a personal digital assistant (PDA), a portable android device (PAD), a portable media player (PMP), an in-vehicle terminal (for example, an in-vehicle navigation terminal), and a fixed terminal, such as a TV, a desktop computer. The electronic device shown in FIG. 14 is merely an example, and should not bring about any limitation to functions and usage scopes of the embodiments of the present disclosure.

As shown in FIG. 14, the electronic device 1400 may include a processing apparatus (for example, a central processor, a graphic processor, etc.) 1401, which may perform various appropriate actions and processing according to a program stored in a read only memory (ROM) 1402 or a program loaded from a storage apparatus 1408 to a random access memory (RAM) 1403. In the RAM 1403, various programs and data required for operations of the electronic device 1400 may also be stored. The processing apparatus 1401, the ROM 1402, and the RAM 1403 are connected to each other by a bus 1404. An input/output (I/O) interface 1405 is also connected to the bus 1404.

Generally, the following apparatuses may be connected to the I/O interface 1405: an input apparatus 1406, which includes, for example, a touch screen, a touch pad, a keyboard, a mouse, a camera, a microphone, an accelerometer, a gyroscope, etc.; an output apparatus 1407, which includes, for example, a liquid crystal display (LCD), a speaker, a vibrator, etc.; a storage apparatus 1408, which includes, for example, a magnetic tape, a hard disk, etc.; and a communication apparatus 1409. The communication apparatus 1409 may allow the electronic device 1400 to communicate with other devices in a wireless or wired way, to exchange data. Although FIG. 14 shows an electronic device 1400 having various apparatuses, it should be understood that it is not required to implement or have all of the shown apparatuses. It is alternatively possible to implement or have more or fewer apparatuses.

In particular, according to an embodiment of the present disclosure, processes described above with reference to flowchart may be implemented as a computer software program. For example, an embodiment of the present disclosure includes a computer program product, which includes a computer program carried on a computer readable medium, and the computer program contains program codes used for executing the method shown in the flowchart. In such embodiment, the computer program may be downloaded and installed from a network via the communication apparatus 1409, or installed from the storage apparatus 1408, or installed from the ROM 1402. When the computer program is executed by the processing apparatus 1401, the above functions defined in the method of the embodiments of the present disclosure are performed.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or components, or any combination thereof. More specific examples of the computer readable storage medium may include, but is not limited to: an electrical connection with one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage component, a magnetic storage component, or any suitable combination thereof. In the present disclosure, a computer readable storage medium may be any tangible medium that contains or stores a program, and the program may be used by or in combination with an instruction execution system, apparatus, or component. In the present disclosure, a computer readable signal medium may include a data signal propagated in a baseband or as a part of a carrier, and the data signal carries computer readable program codes. Such propagated data signal may take various forms, including but not limited to an electromagnetic signal, an optical signal, or any suitable combination thereof. The computer readable signal medium may also be any computer readable medium other than the computer readable storage medium, and the computer readable signal medium may send, propagate, or transmit a program which is used by or in combination with the instruction execution system, apparatus, or component. The program codes contained in the computer readable medium may be transmitted by any suitable medium, including but is not limited to: a wire, an optical cable, a RF (radio frequency), etc., or any suitable combination thereof.

The above computer readable medium may be included in the above electronic device; or may exist alone without being assembled into the electronic device.

The above computer readable medium carries one or more programs that, when executed by the electronic device, cause the electronic device to perform the method shown in the above embodiments.

The computer program codes used to perform operations of the present disclosure may be written in one or more programming languages or a combination thereof, the above programming languages include object-oriented programming languages, such as Java, Smalltalk, C++, and also include conventional procedural programming languages, such as "C" language or similar programming language. The program codes may be executed entirely on a user's computer, executed partly on a user's computer, executed as an independent software package, executed partly on a user's computer and partly on a remote computer, or executed entirely on a remote computer or a server. In the case of a remote computer involved, the remote computer may connect to the user's computer through any kind of networks, which includes a local area network (LAN) or a wide area network (WAN), or, the remote computer may connect to an external computer (for example, connect to the external computer via the Internet by utilizing an internet service provider).

Flowcharts and block diagrams in the accompanying drawings illustrate architectures, functions, and operations of possible implementations of systems, methods and computer program products according to various embodiments of the present disclosure. In this regard, each block in the flowcharts or block diagrams may represent a module, a program segment, or a part of codes, and the module, the program segment, or the part of codes contains one or more executable instructions used for realizing specified logic functions. It should also be noted that in some alternative implementations, functions marked in the block may also occur in an order different from the order marked in the accompanying drawings. For example, two blocks shown in succession may actually be performed substantially in parallel, and they may sometimes be performed in a reverse order, depending on the functions involved. It should also be noted that each block in the block diagrams and/or the flowcharts as well as combinations of blocks in the block diagrams and/or the flowcharts may be implemented by a dedicated hardware-based system that performs specified functions or operations, or may be implemented by a combination of dedicated hardware and computer instructions.

Units involved in the embodiments described in the present disclosure may be implemented in a software or hardware manner. A name of a unit does not constitute a limitation on the unit itself under certain circumstances, for example, a first acquiring unit may also be described as "a unit for acquiring at least two internet protocol addresses".

The functions herein described above may be performed at least in part by one or more hardware logic assemblies. For example, without limitation, exemplary types of hardware logic assemblies that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof.

In a first aspect, one or more embodiments of the present disclosure provide an information processing method, and the method includes:

displaying first information in response to a second user having generated second multimedia content using first multimedia content, where the first multimedia content is multimedia content published by a first user; and acquiring the second multimedia content in response to an operation on the first information and playing the second multimedia content.

According to one or more embodiments of the present disclosure, the acquiring the second multimedia content includes:

acquiring the number of the second user; and acquiring the second multimedia content according to the number of the second user.

According to one or more embodiments of the present disclosure, the acquiring the second multimedia content according to the number of the second user includes:

if the number of the second user is 1, acquiring the second multimedia content generated by the second user using the first multimedia content.

According to one or more embodiments of the present disclosure, the acquiring the second multimedia content according to the number of the second user includes:

if the number of the second user is greater than 1, generating a first page and displaying the first page; and acquiring the second multimedia content in response to an operation on the first page.

According to one or more embodiments of the present disclosure, the first page includes a first area and a second area; and the generating the first page includes:

acquiring a first parameter corresponding to each of the second user, where the first parameter includes at least one of the following: time when the second user publishes the second multimedia content, a popularity of the second user, and view counts of the second multimedia content; and generating an identifier of the first multimedia content in the first area, and generating identifiers and/or first parameters of a plurality of second users in the second area to obtain the first page.

According to one or more embodiments of the present disclosure, the generating the identifiers and/or the first parameters of the plurality of second users in the second area includes:

determining an arrangement order of the second users in the second area according to the first parameters corresponding to the plurality of second users; and displaying the identifiers of the plurality of second users and/or the first parameters corresponding to the plurality of second users according to the arrangement order.

According to one or more embodiments of the present disclosure, the first parameter is the time when the second user publishes the second multimedia content; and the determining the arrangement order of the second users in the second area according to the first parameters corresponding to the plurality of second users includes:

acquiring time differences between the time when the second users publish the second multimedia content and a current moment;

sorting the time differences in an order from small to large to obtain a first order; and determining the first order as the arrangement order of the second users in the second area.

According to one or more embodiments of the present disclosure, the determining the arrangement order of the second users in the second area according to the first parameters corresponding to the plurality of second users includes:

determining arrangement parameters of the second users according to the first parameters corresponding to the second users; and determining the arrangement order of the second users in the second area according to the arrangement parameters.

According to one or more embodiments of the present disclosure, for any second user, the determining the arrangement parameter of the second user according to the first parameter corresponding to the second user includes:

acquiring a first value corresponding to the time when the second user publishes the second multimedia content;

acquiring a second value corresponding to the popularity of the second user;

acquiring a third value corresponding to the view counts of the second multimedia content; and acquiring the arrangement parameter of the second user according to at least one of the first value, the second value and the third value.

According to one or more embodiments of the present disclosure, the acquiring the second multimedia content in response to the operation on the first page includes:

displaying a second page if the operation on the first page is an operation on the identifier of the first multimedia content, where the second page includes identifiers of a plurality pieces of second multimedia content, and acquiring the second multimedia content in response to the operation on the identifier of the second multimedia content; and acquiring the second multimedia content generated by the second user using the first multimedia content if the operation on the first page is an operation on the identifier of the second user.

According to one or more embodiments of the present disclosure, the displaying the first information includes:

displaying the first information on a lock screen page of an electronic device; or, displaying the first information on a user page of the first user.

According to one or more embodiments of the present disclosure, after the playing the second multimedia content, the method further includes:

acquiring an editing operation performed by the first user on the second multimedia content; and sending prompt information to the second user according to the editing operation.

In a second aspect, one or more embodiments of the present disclosure provide an information processing apparatus, the information processing apparatus includes a displaying module, a responding module and a playing module, where:

the displaying module is configured to display first information in response to second user having generated second multimedia content using first multimedia content, where the first multimedia content is multimedia content published by a first user;

the responding module is configured to acquire the second multimedia content in response to an operation on the first information; and the playing module is configured to play the second multimedia content.

According to one or more embodiments of the present disclosure, the responding module is specifically configured to:

acquire the number of the second user; and acquire the second multimedia content according to the number of the second user.

According to one or more embodiments of the present disclosure, the responding module is specifically configured to:

if the number of the second user is 1, acquire the second multimedia content generated by the second user using the first multimedia content.

According to one or more embodiments of the present disclosure, the responding module is specifically configured to:

if the number of the second user is greater than 1, generate a first page and display the first page; and acquire the second multimedia content in response to an operation on the first page.

According to one or more embodiments of the present disclosure, the responding module is specifically configured to:

acquire a first parameter corresponding to each second user, where the first parameter includes at least one of the following: time when the second user publishes the second multimedia content, a popularity of the second user, and view counts of the second multimedia content; and generate an identifier of the first multimedia content in the first area, and generate identifiers and/or first parameters of a plurality of second users in the second area to obtain the first page.

According to one or more embodiments of the present disclosure, the responding module is specifically configured to:

determine an arrangement order of the second users in the second area according to the first parameters corresponding to the plurality of second users; and display the identifiers of the plurality of second users and/or the first parameters corresponding to the plurality of second users according to the arrangement order.

According to one or more embodiments of the present disclosure, the responding module is specifically configured to:

acquire time differences between the time when the second users publish the second multimedia content and a current moment;

sort the time differences in an order from small to large to obtain a first order; and determine the first order as the arrangement order of the second users in the second area.

According to one or more embodiments of the present disclosure, the responding module is specifically configured to:

determine arrangement parameters of the second users according to the first parameters corresponding to the second users; and determine the arrangement order of the second users in the second area according to the arrangement parameters.

According to one or more embodiments of the present disclosure, the responding module is specifically configured to:

acquire a first value corresponding to the time when the second user publishes the second multimedia content;

acquire a second value corresponding to the popularity of the second user;

acquire a third value corresponding to the view counts of the second multimedia content; and acquire the arrangement parameter of the second user according to at least one of the first value, the second value and the third value.

According to one or more embodiments of the present disclosure, the responding module is specifically configured to:

display a second page if the operation on the first page is an operation on the identifier of the first multimedia content, where the second page includes identifiers of a plurality pieces of second multimedia content, and acquiring the second multimedia content in response to the operation on the identifier of the second multimedia content; and acquire the second multimedia content generated by the second user using the first multimedia content if the operation on the first page is an operation on the identifier of the second user.

According to one or more embodiments of the present disclosure, the displaying module is specifically configured to:

display the first information on a lock screen page of an electronic device; or, display the first information on a user page of the first user.

According to one or more embodiments of the present disclosure, the information processing apparatus further includes an acquiring module, and the acquiring module is configured to:

acquire an editing operation performed by the first user on the second multimedia content; and send prompt information to the second user according to the editing operation.

In a third aspect, an embodiment of the present disclosure provide an electronic device, including: a processor and a memory;

the memory stores computer-executable instructions;

the processor executes the computer-executable instructions stored in the memory, so that the processor executes the information processing method of the first aspect and various possibility involves in the first aspect.

In a fourth aspect, an embodiment of the present disclosure provides a computer-readable storage medium, where the computer readable storage medium stores computer executable instructions, and when a processor executes the computer-executable instructions, the information processing method described above in the first aspect and various possibility involves in the first aspect are implemented.

In a fifth aspect, an embodiment of the present disclosure provides a computer program product, including a computer program, which, when executed by a processor, the information processing method of the first aspect and various possibility involves in the first aspect are implemented.

In a sixth aspect, an embodiment of the present disclosure provides a computer program, the computer program is used to implement the information processing method of the first aspect and various possibility involves in the first aspect.

The above description is merely illustration of preferred embodiments of the present disclosure and applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above features with technical features having similar functions as the above features and being disclosed in the present disclosure (without limitation).

In addition, although operations are depicted in a specific order, this should not be understood as requiring these operations to be performed in the specific order as shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or method logical actions, it should be understood that the subject matter defined in the appended claims is not necessarily limited to the specific features or actions described above. Conversely, the specific features and actions described above are merely example forms for implementing the claims.

What is claimed is:

1. An information processing method, implemented by an electronic device of a first user, comprising:

displaying first information in response to a second user having generated second multimedia content using first multimedia content, wherein the first multimedia content is multimedia content published by the first user; and acquiring the second multimedia content in response to an operation on the first information and playing the second multimedia content, wherein the display of the first information is triggered by a response message sent from a server to the electronic device of the first user, and the response message is sent by the server based on information of the second multimedia content from the second user.

2. The method according to claim 1, wherein the acquiring the second multimedia content comprises:

acquiring the number of the second user; and acquiring the second multimedia content according to the number of the second user.

3. The method according to claim 2, wherein the acquiring the second multimedia content according to the number of the second user comprises:

if the number of the second user is 1, acquiring the second multimedia content generated by the second user using the first multimedia content.

4. The method according to claim 2, wherein the acquiring the second multimedia content according to the number of the second user comprises:

if the number of the second user is greater than 1, generating a first page and displaying the first page; and acquiring the second multimedia content in response to an operation on the first page.

5. The method according to claim 4, wherein the first page comprises a first area and a second area; and the generating the first page comprises:

acquiring a first parameter corresponding to each second user, wherein the first parameter comprises at least one of the following: time when the second user publishes the second multimedia content, a popularity of the second user, and view counts of the second multimedia content; and generating an identifier of the first multimedia content in the first area, and generating identifiers and/or first parameters of a plurality of second users in the second area to obtain the first page.

6. The method according to claim 5, wherein the generating the identifiers and/or the first parameters of the plurality of second users in the second area comprises:

determining an arrangement order of the second users in the second area according to the first parameters corresponding to the plurality of second users; and displaying the identifiers of the plurality of second users and/or the first parameters corresponding to the plurality of second users according to the arrangement order.

7. The method according to claim 6, wherein the first parameter is the time when the second user publishes the second multimedia content; and the determining the arrangement order of the second users in the second area according to the first parameters corresponding to the plurality of second users comprises:

acquiring time differences between the time when the second users publish the second multimedia content and a current moment;

sorting the time differences in an order from small to large to obtain a first order; and determining the first order as the arrangement order of the second users in the second area.

8. The method according to claim 6, wherein the determining the arrangement order of the second users in the second area according to the first parameters corresponding to the plurality of second users comprises:

determining arrangement parameters of the second users according to the first parameters corresponding to the second users; and determining the arrangement order of the second users in the second area according to the arrangement parameters.

9. The method according to claim 8, wherein, for any second user, the determining the arrangement parameter of the second user according to the first parameter corresponding to the second user comprises:

acquiring a first value corresponding to the time when the second user publishes the second multimedia content;

acquiring a second value corresponding to the popularity of the second user;

acquiring a third value corresponding to the view counts of the second multimedia content; and acquiring the arrangement parameter of the second user according to at least one of the first value, the second value and the third value.

10. The method according to claim 5, wherein the acquiring the second multimedia content in response to the operation on the first page comprises:

displaying a second page if the operation on the first page is an operation on the identifier of the first multimedia content, wherein the second page comprises identifiers of a plurality pieces of second multimedia content, and acquiring the second multimedia content in response to the operation on the identifier of the second multimedia content; and acquiring the second multimedia content generated by the second user using the first multimedia content if the operation on the first page is an operation on the identifier of the second user.

11. The method according to claim 1, wherein the displaying the first information comprises:

displaying the first information on a lock screen page of an electronic device; or, displaying the first information on a user page of the first user.

12. The method according to claim 1, wherein after the playing the second multimedia content, the method further comprises:

acquiring an editing operation performed by the first user on the second multimedia content; and sending prompt information to the second user according to the editing operation.

13. The method according to claim 1, wherein the first information comprises an identifier of the second user and an identifier of the first multimedia content.

14. An electronic device of a first user, comprising: a processor and a memory;

wherein the memory stores computer executable instructions; and the processor executes the computer executable instructions stored in the memory, causing the processor to:

display first information in response to a second user having generated second multimedia content using first multimedia content, wherein the first multimedia content is multimedia content published by the first user; and acquire the second multimedia content in response to an operation on the first information and playing the second multimedia content, wherein the display of the first information is triggered by a response message sent from a server to the electronic device of the first user, and the response message is sent by the server based on information of the second multimedia content from the second user.

15. The electronic device according to claim 14, wherein the processor is further caused to:

acquire the number of the second user; and acquire the second multimedia content according to the number of the second user.

16. The electronic device according to claim 14, wherein the processor is further caused to:

display a second page if the operation on the first page is an operation on the identifier of the first multimedia content, wherein the second page comprises identifiers of a plurality pieces of second multimedia content, and acquire the second multimedia content in response to the operation on the identifier of the second multimedia content; and acquire the second multimedia content generated by the second user using the first multimedia content if the operation on the first page is an operation on the identifier of the second user.

17. The electronic device according to claim 14, wherein the processor is further caused to:

display the first information on a lock screen page of an electronic device; or, display the first information on a user page of the first user.

18. The electronic device according to claim 14, wherein the processor is further caused to:

acquire an editing operation performed by the first user on the second multimedia content; and send prompt information to the second user according to the editing operation.

19. A non-transitory computer-readable storage medium, wherein the computer readable storage medium stores computer executable instructions, and when a processor of an electronic device of a first user executes the computer executable instructions, the processor is caused to:

display first information in response to a second user having generated second multimedia content using first multimedia content, wherein the first multimedia content is multimedia content published by the first user; and acquire the second multimedia content in response to an operation on the first information and playing the second multimedia content, wherein the display of the first information is triggered by a response message sent from a server to the electronic device of the first user, and the response message is sent by the server based on information of the second multimedia content from the second user.

* * * * *